(12) United States Patent
Ise

(10) Patent No.: US 6,843,225 B1
(45) Date of Patent: Jan. 18, 2005

(54) CONTROLLER FOR CONTROL AT ENGINE STARTUP

(75) Inventor: Takashi Ise, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 10/807,839

(22) Filed: Mar. 24, 2004

(30) Foreign Application Priority Data

Mar. 25, 2003 (JP) ......................................... 2003-082459

(51) Int. Cl.[7] ................................................. F02M 3/00
(52) U.S. Cl. .............................. 123/339.11; 123/339.23; 123/406.56
(58) Field of Search ...................... 123/339.11, 339.23, 123/339.24, 406.56, 406.54

(56) References Cited

U.S. PATENT DOCUMENTS

| 4,399,789 A | * | 8/1983 | Yano ...................... 123/339.11 |
| 4,425,886 A | * | 1/1984 | Kuroiwa et al. ........ 123/339.24 |
| 4,688,534 A | * | 8/1987 | Takeda et al. .......... 123/339.24 |
| 5,343,840 A | * | 9/1994 | Wataya et al. .............. 123/399 |
| 5,586,534 A | * | 12/1996 | Fujimoto ..................... 123/325 |

FOREIGN PATENT DOCUMENTS

| JP | 05-321730 | 12/1993 |
| JP | 10-030480 | 2/1998 |
| JP | 10-047039 | 2/1998 |
| JP | 2000-009010 | 1/2000 |

* cited by examiner

Primary Examiner—John T. Kwon
(74) Attorney, Agent, or Firm—Flynn, Thiel, Boutell & Tanis, P.C.

(57) ABSTRACT

A control unit for engine startup includes a throttle valve, a bypass air quantity-regulating valve, an ignition coil, a bypass air quantity controller, an ignition timing feedback controller, and a multi-spark controller. The throttle valve is disposed in an intake passage of an engine to control intake air quantity. The bypass air quantity-regulating valve controls the air quantity in a bypass passage that bypasses the throttle valve. The ignition coil permits an ignition plug of a same cylinder of the engine to produce multi-sparking during one cycle. The bypass air quantity controller controls the bypass air quantity-regulating valve such that the engine speed is at a target engine speed. The ignition timing feedback controller performs feedback control for the ignition coil such that the ignition timing of the ignition plug is at a target ignition timing. The multi-spark controller controls the ignition coil such that the ignition plug performs multi-spark as necessary. In operation, the control unit reduces the amount of unused hydrocarbons and improves the drivability at startup of a cold engine.

5 Claims, 6 Drawing Sheets

CONTROLLER FOR CONTROL AT ENGINE STARTUP

FIELD OF THE INVENTION

This invention relates to controllers for control at engine startup, and more particularly to a controller for control at engine startup which reduces the amount of HC at startup of a cold engine, for example an internal combustion engine of a vehicle, to enable sufficient intake air quantity to improve drivability with the cold engine and reduce or eliminate engine stall or hesitation.

BACKGROUND OF THE INVENTION

There is known an internal combustion engine on a vehicle including a controller for control at engine startup to reduce the amount of noxious HC in exhaust air at starting of the cold engine. The controller for control at engine startup receives inputs, such as engine speed and coolant temperature, and controls the quantity of intake air and the ignition timing based on these factors.

In a conventional controller disclosed in JP Laid-Open No. H10-30480 for control at engine startup, an idle speed control valve is disposed in a bypass air passage bypassing a throttle valve. An air-increasing control valve for engine startup is disposed in an air-increasing bypass air passage for bypassing the throttle valve. The air-increasing control valve is opened to increase air at engine startup when the engine speed increases to a certain speed after startup operation. In synchronization with this opening operation of the air-increasing control valve at engine startup, feedback control of the idle speed control valve starts. Target engine speed is effectively set at a high speed to facilitate activation of a catalyst.

In another conventional controller disclosed in JP Laid-Open No. H05-321730 for control at internal combustion engine startup, an air quantity-regulating valve regulates the air in a bypass passage for bypassing a throttle valve. Prediction control is performed based on a duty ratio in view of an opening angle of the air quantity regulating valve to improve startability of the engine. The duty ratio is gradually corrected and decreased when actual engine speed is above the engine speed calculated by addition of the target speed and a predetermined speed. Feedback control is performed based on a feedback duty ratio when the actual engine speed increased once and then reduced below the engine speed calculated by addition of the target speed and the predetermined speed so as to prevent the actual engine speed from decreasing below the target speed.

Also in another conventional controller disclosed in JP Laid-Open No. H10-47039, for control at engine startup, if coolant temperature is within a predetermined temperature and if the duration time after the engine startup is shorter than a predetermined time, then it is determined that the catalyst is not activated and an ignition timing is controllable. If the engine speed is at or above a target speed, ignition timing is retarded to increase exhaust temperature. If the engine speed is below the target speed, the ignition timing is advanced toward normal ignition timing. By increasing the exhaust gas temperature, the catalyst is activated at an early stage in using standard fuel to stabilize the fuel combustion in using heavy fuel.

Moreover, in an ignition-timing controller disclosed in JP Laid-Open No. 2000-9010, more than one pair of ignition coils in parallel includes primary and secondary coils in magnetic connection to a power switching element and a driving circuit. Each ignition coil has a secondary side connected through high voltage diodes having a break down voltage higher than a required secondary current for isolation. Thereby, ignition timing of multi-ignition is controlled with precision.

In the conventional controller for control at engine startup, it is typical that the ignition timing is retarded so as to activate the catalyst early to reduce the amount of HC in the cold engine, and bypassed air is supplied so as to maintain the engine speed at the target speed.

However, it is recently required to provide a lean amount of fuel under exhaust gas regulations. Use of heavy fuel of lower volatility than regular fuel results in undesirable fuel combustion, slow response to the target engine speed, engine stall or hesitation.

Accordingly, the conventional controller for control at engine startup depends on the property of the fuel and cannot achieve stable control of the cold engine. Engine stall or hesitation may occur to the detriment of drivability. Also, the amount of HC is not decreased.

Moreover, in the conventional controller, for control at engine startup, the catalyst does not rise to a sufficient activation temperature by the conventional control. There is no choice but to increase the support of the catalyst itself to manage the exhaust purification capacity.

SUMMARY OF THE INVENTION

In order to obviate or minimize the above-mentioned inconvenience, the present invention provides a control unit for engine startup having a throttle valve, a bypass air quantity-regulating valve, an ignition coil, a bypass air quantity controller, an ignition timing feedback controller, and a multi-spark controller. The throttle valve is disposed in an intake passage of an engine to control intake air quantity. The bypass air quantity-regulating valve controls the air quantity in a bypass passage which is bypassing the throttle valve. The ignition coil permits an ignition plug or spark plug of a same cylinder of the engine to produce multi-sparks during one cycle (such as a rapid burst of sparks output by the plug). The bypass air quantity controller controls the bypass air quantity-regulating valve such that the engine speed is at a target engine speed. The ignition timing feedback controller performs feedback control for the ignition coil such that the ignition timing of the ignition plug is at a target ignition timing. The multi-spark controller controls the ignition coil such that the ignition plug performs multi-spark.

According to the present invention, the bypass air quantity controller controls the bypass air quantity regulating valve such that the engine speed is at the target engine speed, and the ignition timing feedback controller performs the feedback control for the ignition coil such that the ignition timing of the ignition plug is at the target ignition timing, and the multi-spark controller controls the ignition coil such that the ignition plug performs multi-sparking. Thereby, the large amount of intake air can be introduced while the engine is cold at startup so as to quickly increase the temperature of the catalyst to an activation temperature. While performing the feedback control of the ignition timing and the multi-spark, the engine speed converges to the target speed, which provides stability for the fuel combustion.

DETAILED DESCRIPTION

Figure 1:
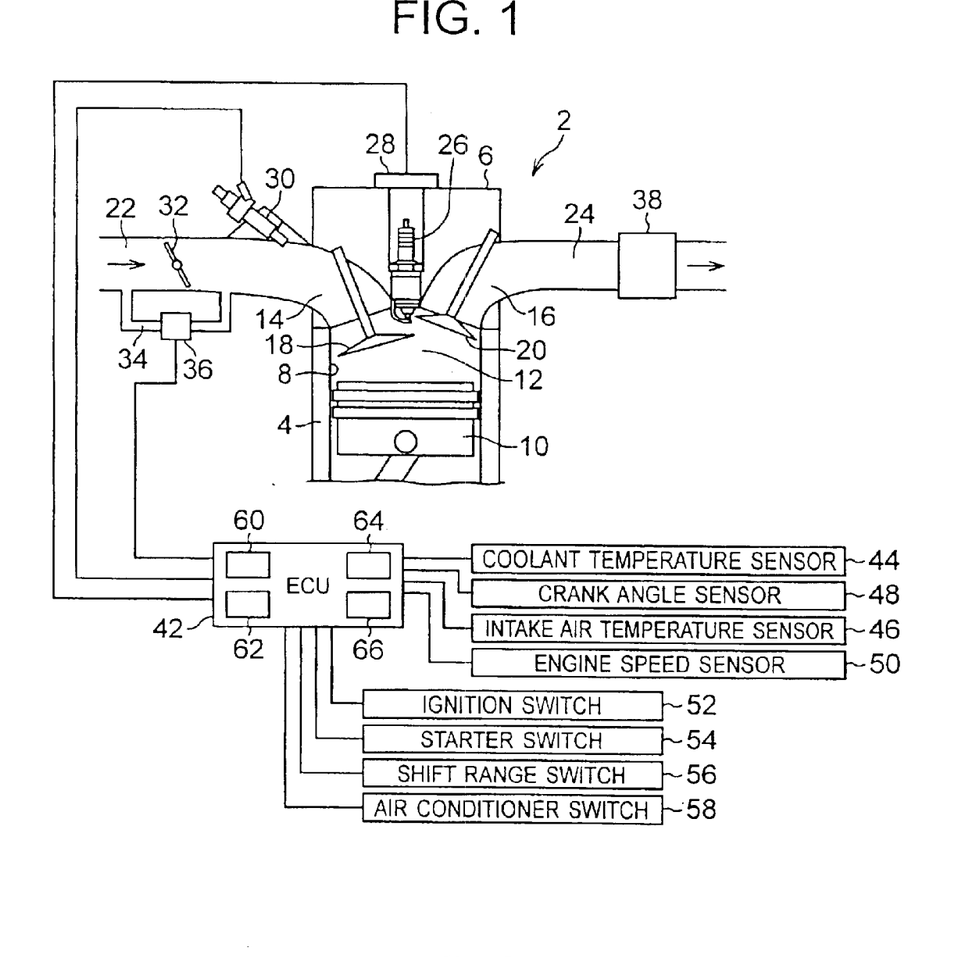
FIG. 1 is a schematic diagram illustrating an embodiment of a control unit for control at engine startup.

The present invention is described in specific detail as follows with reference to the Figures. FIGS. 1–9 illustrate a first embodiment of the present invention. FIG. 1 shows an engine 2 mounted on a vehicle (not shown), a cylinder block 4, a cylinder head 6, a cylinder 8, a piston 10, and a combustion chamber 12. Engine 2 is a multi-cylinder four-stroke engine which includes more than one cylinder 8 in the cylinder block 4, which stroke comprises intake, compression, power, and exhaust cycles.

The engine 2 includes intake and exhaust ports 14, 16 in connection to the combustion chamber 12 in each cylinder 8. Intake and exhaust valves 18, 20 are disposed in the intake and exhaust ports 14, 16. The engine 2 also includes intake and exhaust passages 22, 24 in communication with the intake and exhaust ports 14, 16.

The engine 2 includes a spark or ignition plug 26 facing the combustion chamber 12 in each cylinder 8. Spark plug 26 is connected to an ignition coil 28. The ignition coil 28 supplies high voltage to the ignition plug 26, and permits the spark plug 26 of the same cylinder to produce multi-sparks during each cycle.

The engine 2 includes a fuel injection valve 30 disposed in the intake passage 22 and facing the intake port 14. In an upper side of the intake passage 22 with respect to the fuel injection valve 30, a throttle valve 32 is disposed to control the intake air quantity. A bypass passage 34 bypasses the throttle valve 32 to communicate with the intake passage 22. A bypass intake air quantity-regulating valve 36 regulates the intake air quantity passing through the bypass passage 34.

Figure 2:
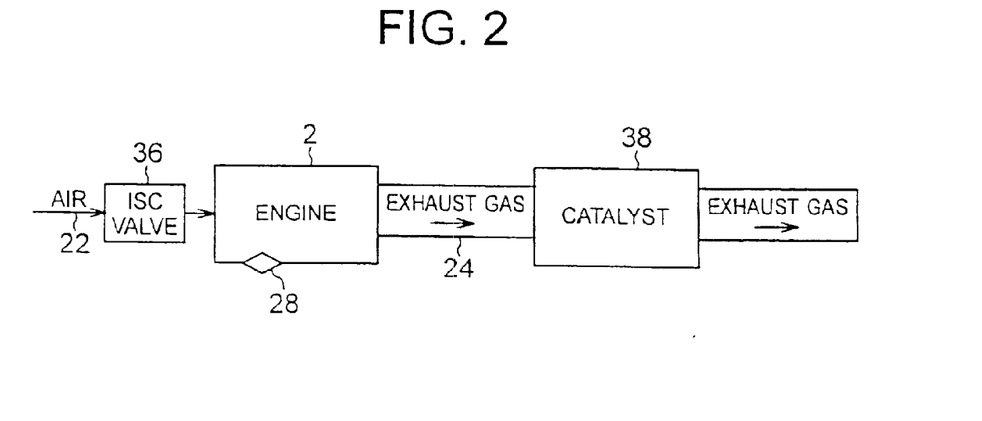
FIG. 2 is a block diagram of a system of the control unit for control at engine startup.

AS shown in FIG. 2, the engine 2 includes a catalyst 38 in the exhaust passage 24. The catalyst 38 removes hydrocarbons (HC), carbon monoxide (CO) and the like from the exhaust gas in the exhaust passage 24.

A control section (ECU) 42 of a controller for control at engine startup 40 is connected to the ignition coil 28, the fuel injection valve 30, and the regulating valve 36.

The control section 42 is connected to a coolant temperature sensor 44 to detect a coolant temperature in the engine 2, an intake temperature sensor 46 to detect an intake air temperature in the intake passage 24, a crank angle sensor 48 to detect an angle of a crankshaft (not shown), and an engine speed sensor 50 to detect the engine speed.

Also the control section 42 is connected to an ignition switch 52 for the engine 2, a starter switch 54 to drive a starter motor (not shown), a shift range switch 56 to detect a shift range of an automatic transmission (not shown) in connection to the engine 2, and an air-conditioning switch 58 to operate an air conditioner (not shown) for the vehicle.

Control section 42 includes a bypass air quantity control means 60, an ignition timing feedback control means 62, a multi-spark control means 64, and a fuel injection control means 66. More particularly, the bypass air quantity control means 60 controls the bypass air quantity-regulating valve 36 such that the engine speed is at the target speed. The ignition timing feedback control means 62 controls the ignition coil 28 such that the ignition timing of the ignition plug 26 is at a target ignition timing. The multi-spark control means 64 controls the ignition coil 28 such that the ignition plug 26 performs multi-spark. The fuel injection control means 66 controls the fuel injection valve 30 to regulate the quantity of injection at a target injection quantity.

Control section 42 receives signals from various sensors and switches 44, 46, 48, 50, 52, 54, 56, 58. The ignition coil 28, the fuel injection valve 30, and the bypass air quantity regulating valve 36 are controlled by the bypass air quantity control means 60, the ignition timing feedback control means 62, the multi-ignition control means 64, and the fuel injection control means 66.

The bypass air quantity control means 60 calculates the target engine speed by adding a first target engine speed and a second target engine speed. The first target engine speed varies according to a coolant temperature at engine startup and when an elapsing time after engine speed exceeds a reference speed for determination of complete explosion (i.e. combustion). The second target engine speed varies according to the coolant temperature at engine startup.

The multi-spark control section 64 controls the ignition plug 26 of the same cylinder to perform multi-spark when the engine speed is below a predetermined speed, or a certain time has elapsed after the engine speed once decreased below a predetermined speed.

Ignition timing feedback control means 62 performs feedback control to advance the ignition timing faster than a base ignition timing when the actual engine speed is below the target engine speed. Multi-spark control means 64 controls the ignition plug 26 of the same cylinder to perform multi-sparking.

This controller or control unit 40 controls at startup of the cold engine 2 to introduce a large amount of bypass intake air to increase the catalyst temperature for early activation. Also the control unit 40 controls the ignition timing set at the target timing and controls the multi-spark to stabilize the state of fuel combustion and converge the engine speed at the target speed set according to the coolant temperature at engine startup.

Operation of this embodiment is explained below.

Figure 3:
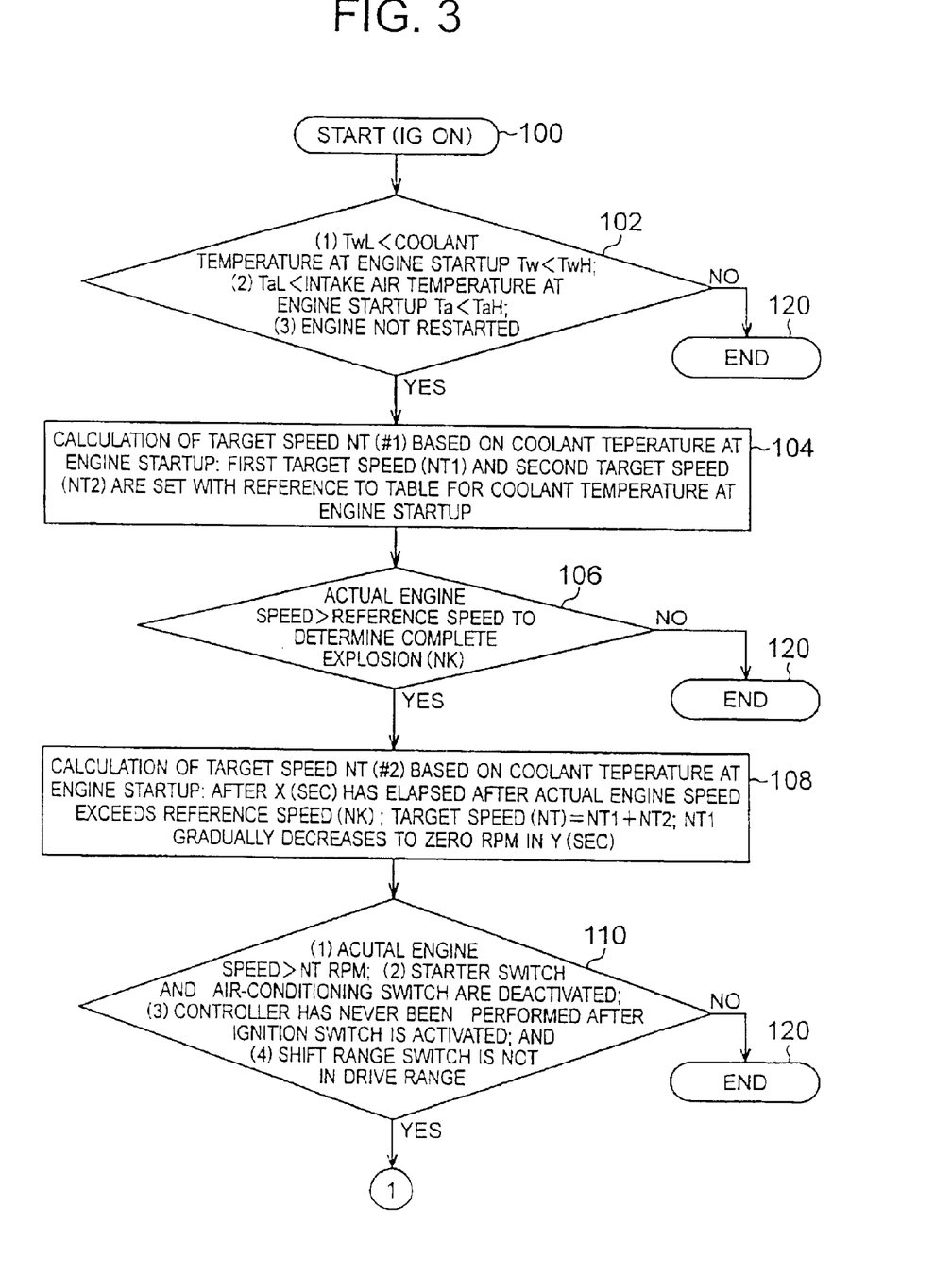
FIG. 3 is a flowchart of the control at engine startup.
Figure 4:
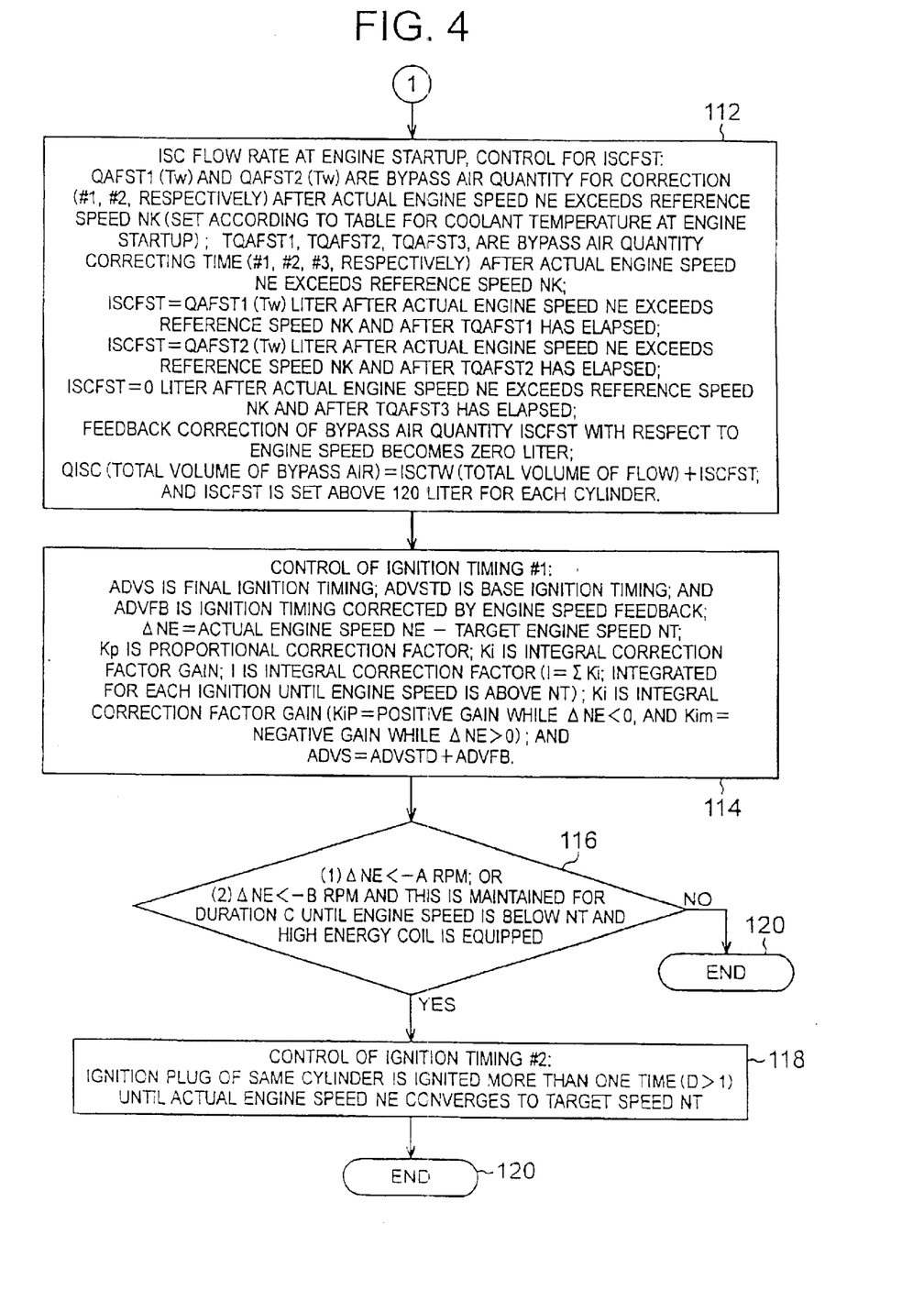
FIG. 4 is a flowchart continued from FIG. 3.

As shown in FIGS. 3 and 4, a program for the controller 40 for control at engine startup starts in step 100 when the ignition switch 52 is activated by an ignition key to start the engine 2 (IG ON). Then the coolant temperature and the intake temperature are measured at engine startup.

If the coolant temperature and the intake temperature at engine startup are below certain temperatures, a large amount of bypass intake air is introduced to utilize the purification capacity of the catalyst 38 as in a conventional controller. If the coolant temperature and the intake temperature at engine startup are at or above the certain temperatures, the exhaust gas component is acceptable due to a small quantity of fuel injection.

After the programs at step 100, the controller 40 for control at engine startup determines in step 102 whether (1)

the coolant temperature Tw at engine startup is higher than a predetermined low coolant temperature TwL but lower than a predetermined high coolant temperature TwH (e.g., −10 degrees C<Tw<40 degrees C.), (2) the intake temperature Ta at engine startup is higher than a predetermined low intake temperature TaL but lower than a predetermined high intake temperature TaH (e.g., −10 degrees C<Ta<40 degrees C.), and (3) the engine 2 is not restarted.

If the determination in step 102 is "NO", the program ends at step 120. If the determination in step 102 is "YES", that is, the engine 2 is starting in a cold state, then a target engine speed NT for the engine speed N is calculated at step 104 based on the coolant temperature at engine startup.

Figure 5:
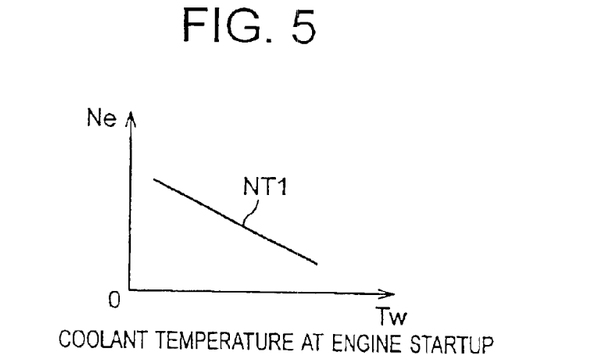
FIG. 5 is a table for a first coolant temperature at engine startup to determine a first target engine speed.
Figure 6:
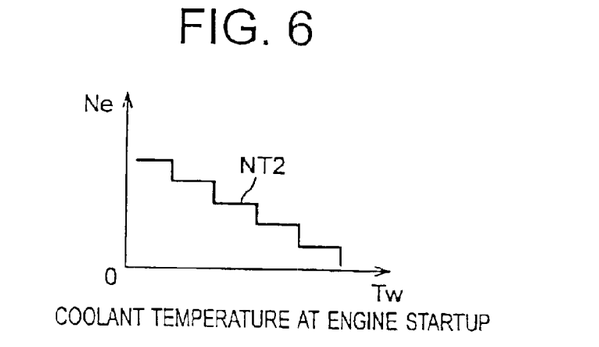
FIG. 6 is a table for a second coolant temperature at engine startup to determine a second target engine speed.

This target engine speed NT is comprised of the first target engine speed NT1 and a second target engine speed NT2. As shown in FIG. 5, the first engine speed NT1 is set according to a table for the first coolant temperature at engine startup. As shown in FIG. 6, the second engine speed NT2 is set according to a table for the second coolant temperature at engine startup.

Then, a determination is made at step 106 whether the actual engine speed Ne exceeds a reference engine speed for determination of the complete explosion (i.e. combustion) NK. If the determination at step 106 is "NO", the program ends at step 120. If the determination in step 106 is "YES", the target engine speed NT is calculated based on the coolant temperature at engine startup signal and elapsed time at step 108.

Figure 7:
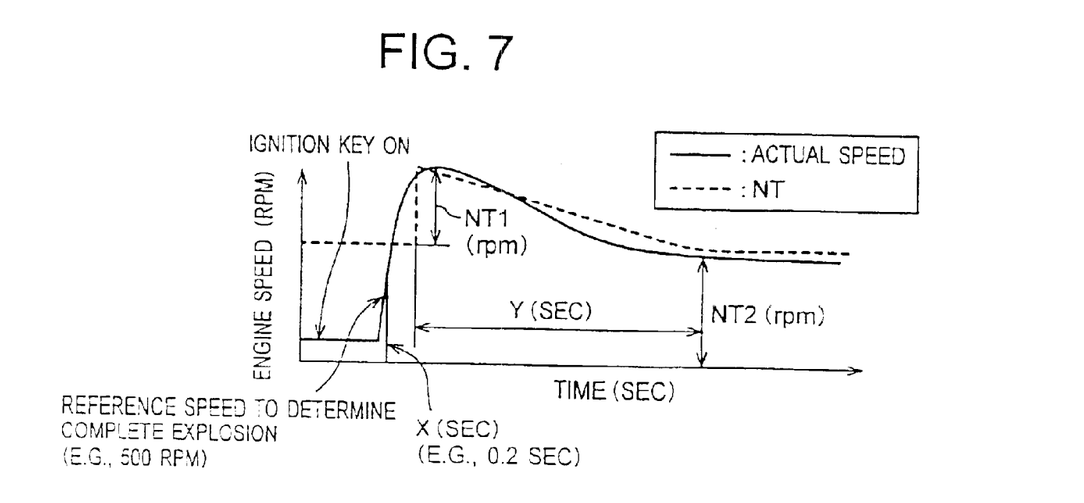
FIG. 7 is a timing chart of the engine speed.

Specifically, as shown in FIG. 7, the target engine speed NT is calculated by addition of the first and second target speeds NT1 and NT2 after a predetermined time X has elapsed from when the actual engine speed Ne exceeded the reference speed to determine complete explosion NK (e.g., reference engine speed 500 rpm). The first target speed NT1 is set to decrease to zero rpm after a decay time Y has elapsed from the predetermined time X.

Thereby, the target speed NT is calculated by addition of the first target engine speed, which varies according to a coolant temperature at engine startup and the elapsing time Y after the engine speed exceeds the reference speed NK for determination of complete explosion (i.e. combustion), and the second target engine speed, which varies according to the coolant temperature at engine startup.

At step 110 it is determined whether the following conditions are all satisfied: (1) the actual engine speed Ne exceeds the reference speed for complete explosion determination NK, (2) the starter switch 54 and the air-conditioning switch 58 are deactivated, (3) this controller for control at engine startup has never been performed after the ignition switch 52 was activated, and (4) the shift range switch 56 is not in a drive range.

In this determination at step 110, once the condition is satisfied and the controller for control at engine startup is activated, the controller is not activated again. That is, the controller for control at engine startup is not activated other than at engine startup. Also, the large amount of bypass intake air is not introduced when the shift range of the automatic transmission is in the drive range.

If the determination at step 110 is "NO", the program ends at step 120. If the determination at step 110 is "YES", a control for the bypass air quantity (ISC flow rate) at engine startup begins.

Figure 8:
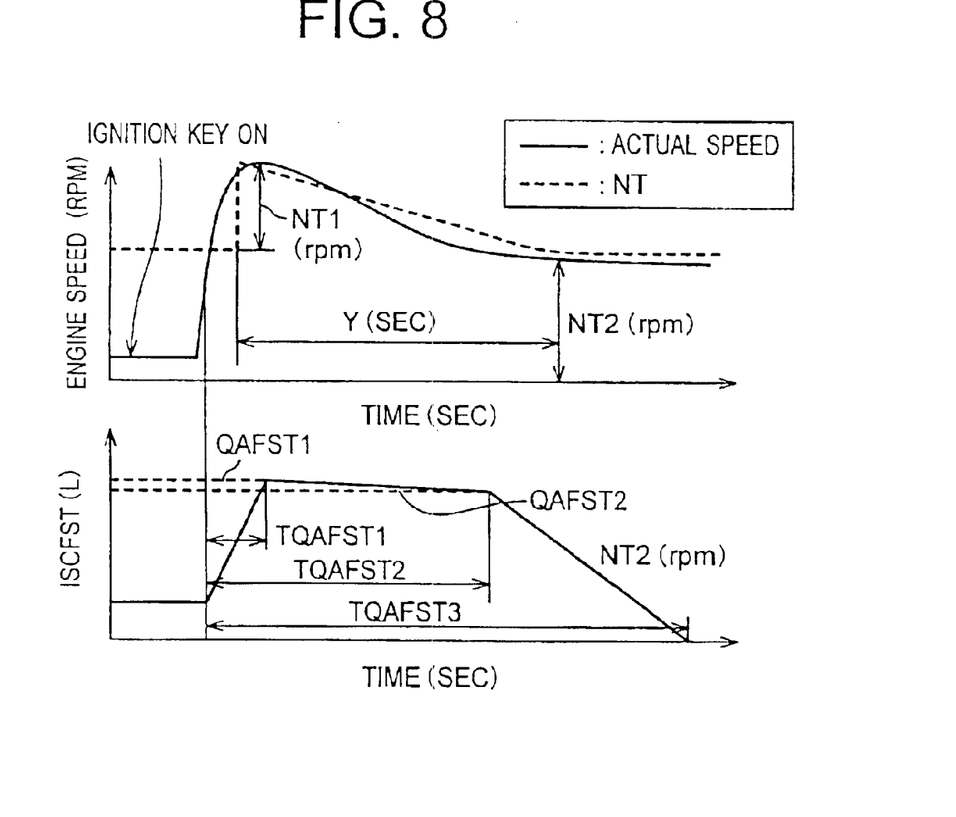
FIG. 8 is a timing chart for the engine speed and the bypass air quantity.

The bypass air quantity "ISCFST" at engine startup is shown in FIG. 8. QAFST1 (Tw) is a bypass air quantity (liters) for correction after the actual engine speed Ne exceeds the reference speed for complete explosion determination NK (set according to the table for coolant temperature at engine startup). QAFST2 (Tw) is a bypass air quantity for correction #2 after the actual engine speed Ne exceeds the reference speed for complete explosion determination NK (set according to the table for coolant temperature at engine startup). TQAFST1 is a bypass air quantity correcting time after the actual engine speed Ne exceeds the reference speed for complete explosion determination NK. TQAFST2 is a bypass air quantity correcting time #2 after the actual engine speed Ne exceeds the reference speed for complete explosion determination NK. TQAFST3 is a bypass air quantity correcting time #3 after the actual engine speed Ne exceeds the reference speed for complete explosion determination NK. ISCFST becomes equal to QAFST1 (Tw) liters after the actual engine speed Ne exceeds the reference speed for complete explosion determination NK and after TQAFST1 has elapsed. ISCFST becomes equal to QAFST2 (Tw) liters after the actual engine speed Ne exceeds the reference speed for complete explosion determination NK and after TQAFST2 has elapsed. ISCFST becomes zero liters after the actual engine speed Ne exceeds the reference speed for complete explosion determination NK and after TQAFST3 has elapsed. Feedback correction of the bypass air quantity ISCFST with respect to the engine speed becomes zero liters. QISC (total volume of bypass air) can be represented by the equation: QISC=ISCTW (total volume of flow)+ISCFST. ISCFST is set at a large quantity such as above 120 liters for each cylinder.

Thus, at engine startup, the bypass air quantity is set to become large after the actual engine speed Ne exceeds the reference speed NK for complete explosion determination and after TQAFST1. Thereby, an extremely lean air/fuel ratio is provided and rapid increase in the engine speed can be restrained. In addition, feedback correction with respect to the engine speed is at zero liters, so that the large quantity of the bypass air can be introduced until the maximum flow rate.

Figure 9:
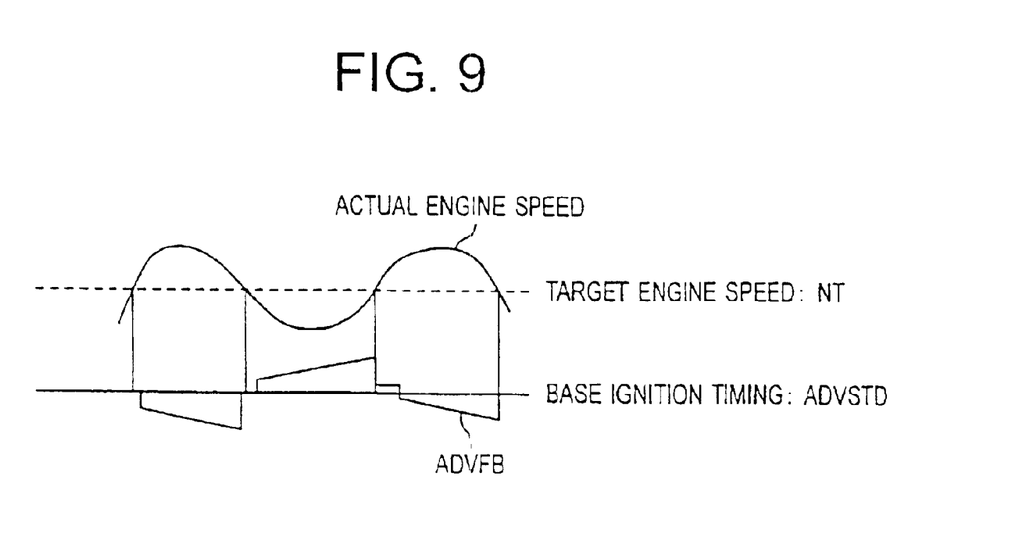
FIG. 9 is a timing chart for the engine speed and the ignition timing.

After step 112 for the control of the bypass air quantity, feedback control for the ignition timing is performed at step 114. Control of the bypass air quantity is shown in FIG. 9. ADVS is final ignition timing, ADVSTD is base ignition timing, and ADVFB is ignition timing corrected by the engine speed feedback. ÄN e is represented by the equation: ÄN e=actual engine speed Ne—target engine speed NT. Kp is a proportional correction factor. Ki is integral correction factor gain. I is integral correction factor (I=ÓKi; Ki is integrated for each ignition until the engine speed is above NT). Ki is integral correction factor gain (Kip represents positive gain while ÄN e is less than zero, and Kim represents negative gain while ÄN e is greater than zero). ADVS is calculated by the equation: ADVS=ADVSTD+ ADVFB. Feedback control is performed such that the ignition timing is at the final ignition timing ADVS.

Next, a determination is made at step 116 whether (1) the actual engine speed Ne decreases from the target speed NT to a first predetermined speed A (represented by the equation; ÄN e<−A), or (2) duration, from when the actual engine speed Ne decreases from the target speed NT to a second predetermined speed B, is maintained for a predetermined time C (represented by the equation: ÄN e<−B; duration>C).

If the determination at step 116 is "NO", the program ends at step 120. If the determination at step 116 is "YES", the ignition plug 26 of the same cylinder is ignited more than one time (D>1) at step 118 until the actual engine speed Ne converges to the target speed NT, and then the program ends at step 120.

This multi-sparking is performed when the engine speed is decreased to the extent that the feedback control of the ignition timing cannot cover, or when the engine speed is decreased and the predetermined time has elapsed but the engine speed is not converged to the target speed NT. Incidentally, how many times (times D; the number of sparks D) multi-spark is performed depends on the temperature of the coolant in the engine 2. The lower the temperature is, the less the number of times D is set at.

As thus described, the bypass air quantity control means 60 controls the bypass air quantity regulating valve 36 such that the engine speed is at the target speed. The ignition timing feedback control means 62 controls the ignition coil 28 such that the ignition timing of the ignition plug 26 is at the target ignition timing. The multi-spark control means 64 controls the ignition coil 28 such that the ignition plug 26 performs multi-sparking.

The bypass air quantity control means 60 calculates the target speed by addition of the first target engine speed, which varies according to the coolant temperature at engine startup and the elapsing time Y after the engine speed exceeds the reference speed NK for determination of complete explosion, and the second target engine speed, which varies according to the coolant temperature at engine startup.

The multi-spark control section 64 controls the ignition plug 26 of the same cylinder to perform multi-sparking when the engine speed is below the predetermined speed, or a certain time has elapsed after the engine speed once decreased below the predetermined speed.

Moreover, ignition timing feedback control means 62 performs the feedback control to advance the ignition timing faster than the base ignition timing when the actual engine speed is below the target engine speed. Multi-spark control means 64 controls the ignition plug 26 of the same cylinder to perform multi-sparking.

Thereby, the control unit 40 controls at startup of the cold engine 2 to introduce the large amount of bypass intake air to increase the catalyst temperature for early activation. Also the controller 40 sets the ignition timing at the target timing and controls the multi-sparking to stabilize the state of fuel combustion to converge the engine speed at the target speed set according to the coolant temperature at engine startup. Ignition timing is advanced and ignition is performed twice when the actual engine speed is below the target speed. Ignition timing is retarded and ignition is performed once when the actual engine speed is above the target speed. Thereby, the property of the fuel does not affect the system, and the detriment of the fuel combustion can be avoided.

Accordingly, the control unit 40 for control at engine startup permits the catalyst 38 to activate at an early state in the cold engine to reduce the amount of HC released. Also, the precise appropriate target engine speed can be set to increase the sufficient intake air to improve the drivability of the cold engine. Reliable control of the cold engine can be achieved without affection by the property of the fuel, thereby avoiding engine stall or hesitation.

In this embodiment, at startup of the cold engine 2, a large amount of the bypass air in the bypass passage 34 is introduced. However, a large amount of air in the intake passage 22 may also be introduced to increase the temperature of the catalyst 38 for quick activation.

Figure 10:
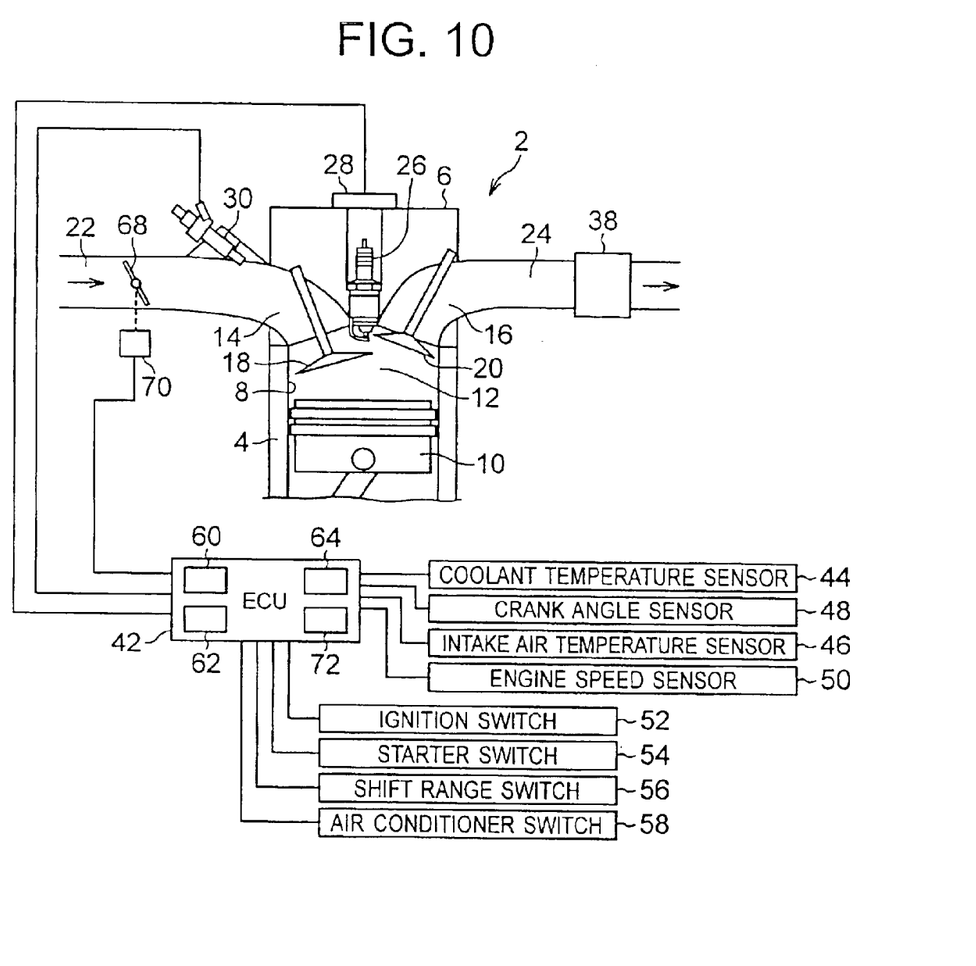
FIG. 10 is a schematic diagram illustrating another embodiment of a control unit for control at engine startup.

FIG. 10 illustrates anther embodiment of the present invention. The same reference numerals are hereinafter utilized for features identical or similar in function to those described in the first embodiment. In the controller for control at engine startup shown in FIG. 10, an electronic throttle valve 68 is disposed in the intake passage 22 to control the air quantity. An actuator 70 is connected to the control section 42 and operates to open/close the electronic throttle valve 68. In the control section 42, an intake air quantity control means 72 is disposed to control the actuator 70 of the electronic throttle valve so that the engine speed is at the target speed.

In this latter embodiment of the present invention, the electronic throttle valve 68 is disposed in the intake passage 22 to control the air quantity. The ignition coil 28 permits the ignition plug 26 of the same cylinder of the engine 2 to produce multiple-sparks in one cycle. The intake air quantity control means 72 is disposed to control the actuator 70 of the electronic throttle valve so that the engine speed is at the target speed. The ignition timing feedback control means 62 performs feedback control for the ignition coil 26 such that the ignition timing of the ignition plug 26 is at a target ignition timing. The multi-spark control means 64 controls the ignition coil 28 such that the ignition plug 26 performs multi-sparking.

By the controller 40 of this embodiment at engine startup, a large amount of air in the intake passage 22 is introduced to increase the temperature of the catalyst 38 for quick activation. Also the controller 40 sets the ignition timing at the target timing and controls the multi-spark to stabilize the state of fuel combustion to converge the engine speed at the target speed set according to the coolant temperature at engine startup. Thereby, the property of the fuel does not affect the system, and the detriment of the fuel combustion can be avoided.

Accordingly, the controller 40 for control at engine startup achieves a similar effect as the above-mentioned embodiment. By only changing the program, this embodiment can be applied to the engine 2 with the electronic throttle valve 68.

The present invention is not limited to the above, but is susceptible to various variations or modifications.

For example, the control can be simplified by pre-setting the quantity of the bypass air, the target ignition timing, and the frequency of multi-sparking according to the temperature of the coolant for the engine 2, and then by reading out a combination of the bypass air quantity, the target ignition timing, and the frequency of the multi-sparking to employ for the controller. In addition, by setting the target engine speed by combination of the temperature detected at engine startup with the intake temperature, the fuel combustion can be stabilized without affecting the property of the fuel. Moreover, when the ignition plug 26 of the same cylinder performs multi-sparking, i.e., sparking "n" times, strength and frequency of each spark of the first spark to the "n"th spark can be varied according to the property of the fuel, thereby stablizing the fuel combustion without affection of the property of the fuel.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A control unit for control at vehicle engine startup, comprising:
   a throttle valve in an intake passage of an engine to control intake air quantity;
   a bypass air quantity regulating valve to control the air quantity in a bypass passage which is bypassing said throttle valve;

an ignition coil to permit an ignition plug of a same cylinder of said engine to produce multi-sparks during one cycle;

a bypass air quantity controller to control said bypass air quantity regulating valve such that the engine speed is at a target engine speed;

an ignition timing feedback controller to perform feedback control for said ignition coil such that the ignition timing of said ignition plug is at a target ignition timing; and a multi-spark controller to control said ignition coil such that said ignition plug performs multiple-sparking.

2. The control unit for control at engine startup as defined in claim 1, wherein said bypass air quantity controller calculates the target engine speed by adding a first target engine speed and a second target engine speed, and said first target engine speed varies according to a coolant temperature at engine startup and according to an elapsing time after engine speed exceeds a reference speed for determination of complete explosion, and said second target engine speed varies according to the coolant temperature at engine startup.

3. The control unit for control at engine startup as defined in claim 1, wherein said multi-spark controller controls the ignition plug of the same cylinder to perform multi-sparking of the plug when the engine speed is below a predetermined speed, or a certain time has elapsed after the engine speed has once decreased below a predetermined speed.

4. The control unit for control at engine startup as defined in claim 1, wherein said ignition timing feedback controller controls by feedback to advance the ignition timing faster than a base ignition timing when the actual engine speed is below the target engine speed, and said multi-spark controller controls the ignition plug of the same cylinder to perform multi-sparking.

5. A control unit for control at engine startup, comprising:

an electronic throttle valve disposed in the intake passage to control intake air quantity;

an ignition coil to permit an ignition plug of a same cylinder of an engine to produce multi-sparking during one cycle of combustion;

an intake air quantity controller to control said electronic throttle valve such that the engine speed is at a target engine speed;

an ignition timing feedback controller to perform feedback control for said ignition coil such that the ignition timing of said ignition plug is at a target ignition timing; and a multi-spark controller to control said ignition coil such that said ignition plug performs multi-sparking per engine combustion cycle.

* * * * *